United States Patent [19]

Krafthefer et al.

[11] Patent Number: 5,729,019
[45] Date of Patent: Mar. 17, 1998

[54] SPLIT FIELD-OF-VIEW UNCOOLED INFRARED SENSOR

[75] Inventors: Brian C. Krafthefer, Stillwater; Michael L. Rhodes, Richfield; Thomas G. Stratton, Roseville, all of Minn.

[73] Assignee: Honeywell Inc., Minneapolis, Minn.

[21] Appl. No.: 586,016

[22] Filed: Dec. 29, 1995

[51] Int. Cl.$^6$ .................. G01J 5/06; G01J 5/08; G08B 13/193
[52] U.S. Cl. ............ 250/353; 250/349; 250/DIG. 1
[58] Field of Search .................. 250/338.4, 342, 250/349, 353, DIG. 1

[56] References Cited

U.S. PATENT DOCUMENTS

| | | | |
|---|---|---|---|
| 3,631,434 | 12/1971 | Schwartz | 250/DIG. 1 X |
| 3,684,996 | 8/1972 | Schwarz | 250/DIG. 1 X |
| 4,614,938 | 9/1986 | Weitman | |
| 4,937,450 | 6/1990 | Wakabayashi et al. | 250/353 X |
| 5,134,292 | 7/1992 | Segawa et al. | 250/353 X |
| 5,260,225 | 11/1993 | Liu et al. | |
| 5,397,897 | 3/1995 | Komatsu et al. | 250/338.4 |
| 5,446,285 | 8/1995 | Choi | 250/DIG. 1 X |
| 5,450,053 | 9/1995 | Wood | |
| 5,461,231 | 10/1995 | Sugimoto et al. | 250/DIG. 1 X |

FOREIGN PATENT DOCUMENTS

| | | |
|---|---|---|
| 0580395A | 1/1994 | European Pat. Off. |
| 2228618A | 2/1989 | United Kingdom |
| 9400950 | 1/1994 | WIPO |

OTHER PUBLICATIONS

JEE Journal of Electronic Engineering 32(1995) Aug., No. 344, Tokyo, Japan, pp. 19,20,21.

*Primary Examiner*—Edward J. Glick
*Attorney, Agent, or Firm*—John G. Shudy, Jr.

[57] ABSTRACT

An occupancy sensor having a primary infrared radiation sensor and a secondary infrared radiation sensor in an integrated vacuum package having a window that provides separate fields of view to the sensors, respectively. The primary sensor is for monitoring occupancy of a selected space. The secondary sensor is for monitoring the background radiation of the space. Signals from the primary and secondary sensors are electronically processed and compared, and the occupancy level of the selected space is determined. Temperature and visible light sensors may also be incorporated. Sensor information is used to control temperature, ventilation, lighting and other parameters of the selected space.

13 Claims, 7 Drawing Sheets

SPLIT FIELD-OF-VIEW UNCOOLED INFRARED SENSOR

BACKGROUND OF THE INVENTION

The present invention pertains to infrared (IR) sensors and particularly to uncooled infrared sensors for use in building temperature control applications. More particularly, the invention pertains to a room "comfort sensor" for determining occupancy. Typical comfort sensors detect occupancy by motion; or if they detect radiation of an occupant, such detection is via a lens structure on a sensor structure aimed in the direction of a particular area or space where a presence of occupants is possible.

SUMMARY OF THE INVENTION

The present invention is a comfort sensor that detects the occupancy of a room without the requirement of motion of an occupant. The sensor has several IR sensors which have different fields of view each of which previously required a separate lens element. Instead of a lens element, the invention incorporates an optical element or a window as a top cap for an integrated vacuum package. This invention is novel because the window is part of the integrated vacuum package, and the window uses an etched feature to provide multiple fields of view for uncooled IR arrays in the single integrated vacuum package. This invention is useful because it provides additional functionality with no additional processing or packaging steps as required by previous technology.

DESCRIPTION OF PREFERRED EMBODIMENT

The present occupancy sensor measures radiant energy as well as light and temperature to allow a control of the building, heating, ventilation and lighting systems based on factors other than ambient air temperature. The comfort sensor is a composite of several sensors whose responses are integrated and used to access the human comfort of a given environment. The sensor may be used for temperature control or light adjustment according to occupancy. Occupancy of a room is one such factor. The device has at least four different sensors on it. These include a primary IR sensor, a secondary IR sensor, a temperature sensor, and a visible light sensor. These sensors are included in the integral vacuum package of the comfort sensor. The infrared detectors, temperature sensors and photosensors are fabricated in a single process. The objective of a mask set is to incorporate this multi-sensor process together with a packaging technique whereby the first stage package can be integrated at the wafer level. This design is incorporated within an integrated vacuum package. The IR sensor itself also may be utilized to determine the level or integrity of the vacuum in the integrated package. By including on a single device a number of independent IR sensors, each with a different field of view, the occupancy of a room can be inferred. The comfort sensor design includes a main array of 32×32 separate pixels and a secondary array of 2×8 pixels.

The device uses an uncooled IR micro-bolometer with a thermocouple structure on a thermally isolated bridge (each is a pixel) to detect 3 to 12 micrometer radiation. The primary or main IR sensor is a 32×32 array of thermoelectric detectors connected in series, with each detector having two thermocouples on it. A signal is generated from 2048 junctions in series. Each pixel is approximately 3 mils on a side and is formed by selectively etching the silicon from underneath it. The main IR sensor generates a signal larger than background if a radiating entity or occupant is in the field of view. Typically, only one main sensor is in an occupancy sensor.

Examples of uncooled microbolometer infrared sensors that may be used in the present invention are disclosed in U.S. Pat. Nos. 5,260,225 and 5,450,053, 5,260,225, by Michael S. Liu et al., issued Nov. 9, 1993, and entitled "Integrated Infrared Sensitive Bolometers," is hereby incorporated in this present description by reference. U.S. Pat. No. 5,450,053, by R. Andrew Wood, issued Sep. 12, 1995, entitled "Use of Vanadium Oxide in Microbolometer Sensors," is hereby incorporated in this present description by reference.

One may install the occupancy sensor to check different segments of a room for occupancy. The sensors distinguish the occupancy area from a background area of the room. There may be different background signals which include one or two secondary sensors, a light sensor, and a temperature sensor. Each secondary IR array senses occupant-free area to generate a background signal. The secondary IR sensor is made to look at a wall rather than ceiling or floor. The main or primary IR sensor is made to look at the floor and/or a wall, but not at the ceiling if the sensor is installed in the ceiling. Installation of the occupancy sensor in the ceiling is easier and more inexpensive than in a wall. Typically, only one sensor is installed per room, whether on the wall or ceiling. The sensor may be used in offices or homes.

The "spot" or secondary IR sensor is a 2×8 array of thermoelectric detectors which are the same design as those used for the primary IR sensor. The purpose for the spot detector is to have a detector that is looking with a different field of view so that between the "spot" or background, and the area sensed by the primary sensor, information about the occupancy of area can be separated and distinguished from the mean radiant information of the secondary sensor to indicate an occupancy status.

The temperature sensor is simply a resistive temperature detector or RTD. A first metal (NiFe) may be patterned as a simple resistor to determine the IR sensor chip temperature. The temperature sensor may be placed outside of or external to the integral vacuum seal to minimize the number of steps the seal must cover. It is on the same substrate as the primary and secondary IR sensors. The temperature sensor provides information as to temperature control based on occupancy of the monitored area. Also temperature information is used to compensate the electronics of the comfort sensor.

The visible light sensor is used to generate a feedback for lighting controls of the monitored space. The light sensor is a photodetector for detecting the level of visible light in the room or monitored space. The visible light sensor may be inside or outside of the integral vacuum package seal.

The maximum thermal time constant of the primary IR 32×32 array sensor is 500 milliseconds and the total detector resistance is 800,000 ohms. The time constant is a factor of the electronics looking at and processing the output from this sensor. The longer the time constant, the more thermal response the detector can integrate, but also generally speaking the weaker the microstructure is. The trend is that as the electrical noise increases, it is more favorable to increase the number of junctions. This means that a larger signal is more important than less efficient thermal isolation in a noisy system.

To provide each of the IR sensors with different fields of view has previously required a separate lens element. Instead of lens elements, the present comfort sensor incorporates an optical window as the top cap of an integrated vacuum package (IVP). The window has one or more facets etched to provide additional fields of view.

To obtain the maximum sensitivity, the IR pixels of the comfort sensor are operated in a vacuum, as noted above. The major features of the top cap wafer have to do with the creation of an integral vacuum cavity by way of a solder ring seal between the IR detector wafer of elements and the silicon window wafer of elements. The top cap wafer or window is made of silicon that is transparent to light. However, one can use a GaAs substrate and so forth, but silicon is easier to create a vacuum environment with. Two secondary arrays with a window on a T05 or T08 can package, can be on the header of the can. The TO can itself is not needed for vacuum encapsulation. The IR sensor integrated vacuum package may instead be put on a DIP package. In either case, the window may be divided up into different fields of view for the various IR sensors, for sensing discrimination of various portions of the area sensed or monitored.

Figure 1A:
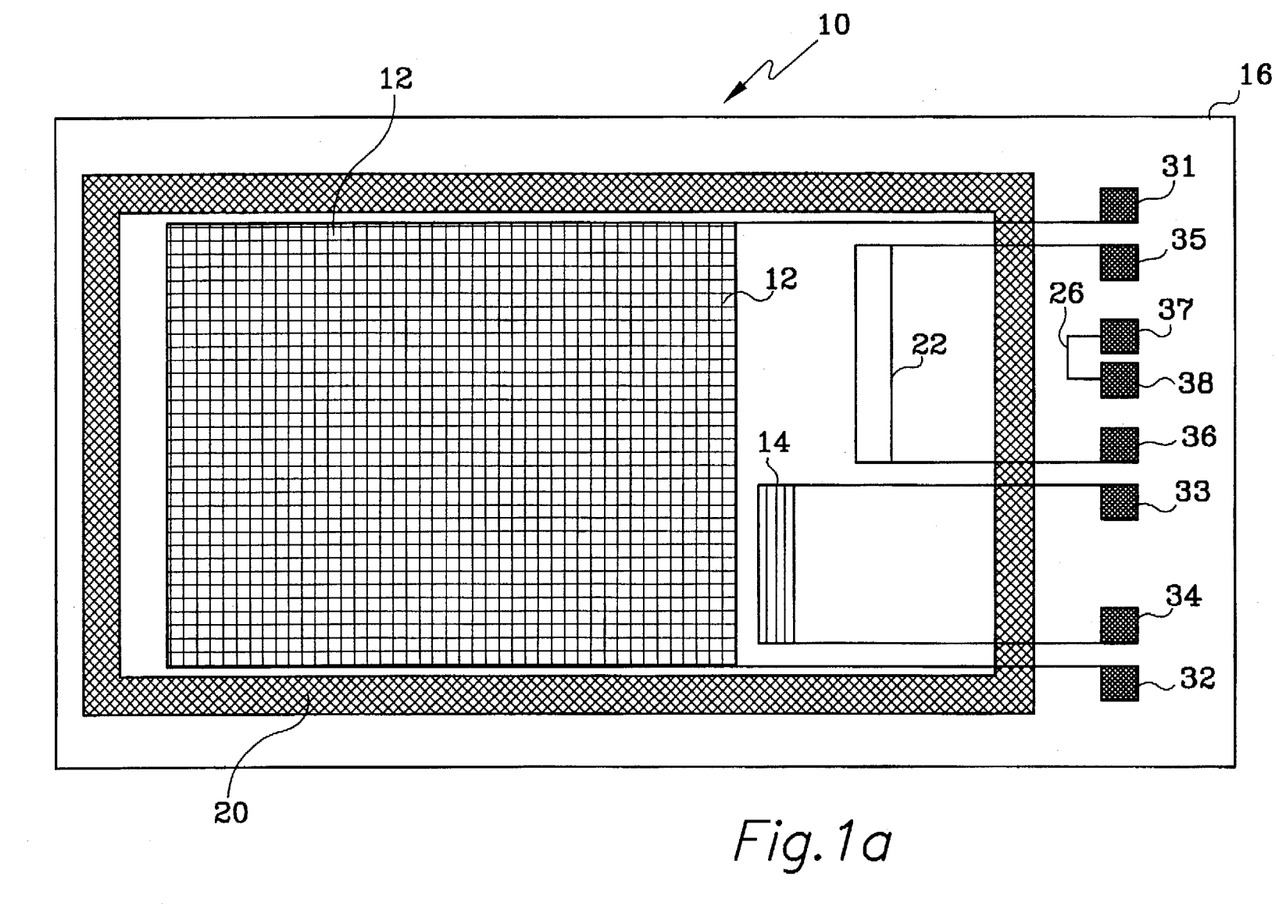
FIGS. 1a and 1b show a sensor having the primary and secondary arrays under a single flat part of the window.
Figure 1B:
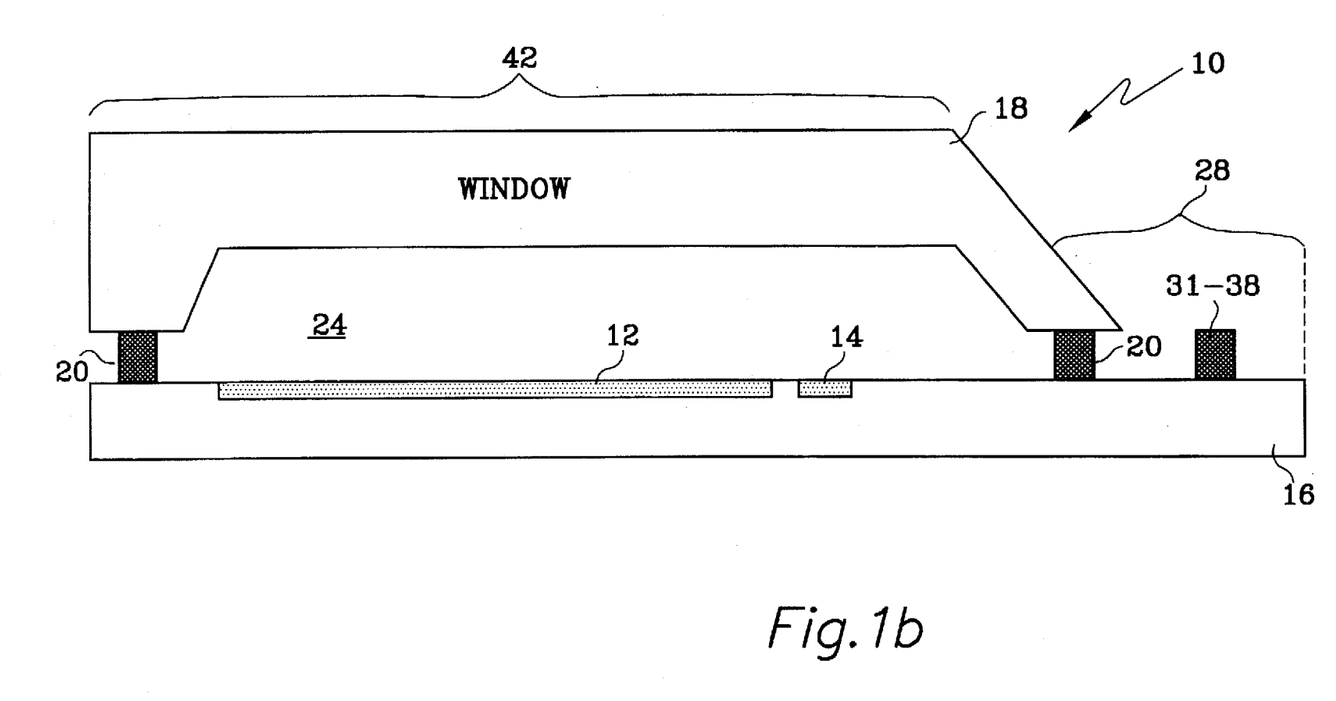

FIGS. 1a and 1b show one embodiment 10 of the invention having a main uncooled IR sensor array 12 and a secondary uncooled IR sensor array 14 on substrate 16 under window 18. Sensors 12 and 14 are vacuum sealed by window 18 and substrate 16 with a sealing ring 20. Also in comfort sensor 10 is a visible light photodetector 22 under window 18. External to the vacuum sealed chamber 24, is a temperature sensor 26. Since IR arrays 12 and 14 are under the flat part 42 of window 18, or the part 42 of window 18 which is parallel to substrate 16, both arrays 12 and 14 have essentially the same field of view. Anisotropic etching is used on the package of sensor 10 to form a port to permit access to bonding pads 31–38 from the top side of the integrated vacuum package (IVP) of sensor 10.

Figure 2A:
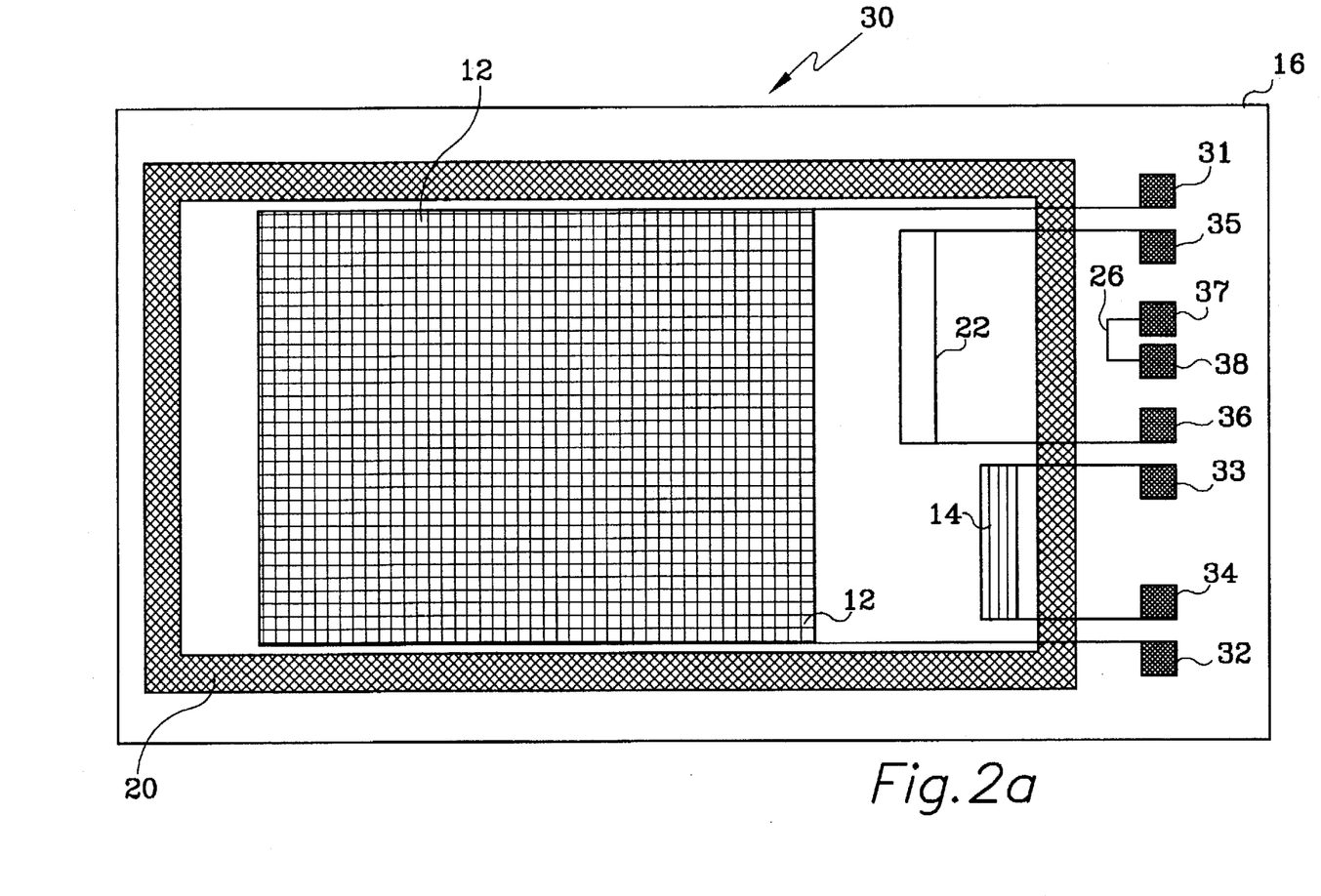
FIGS. 2a and 2b show a sensor having the primary or main array under the flat part of the window and the secondary array under the sloped part of the window or top cap.
Figure 2B:
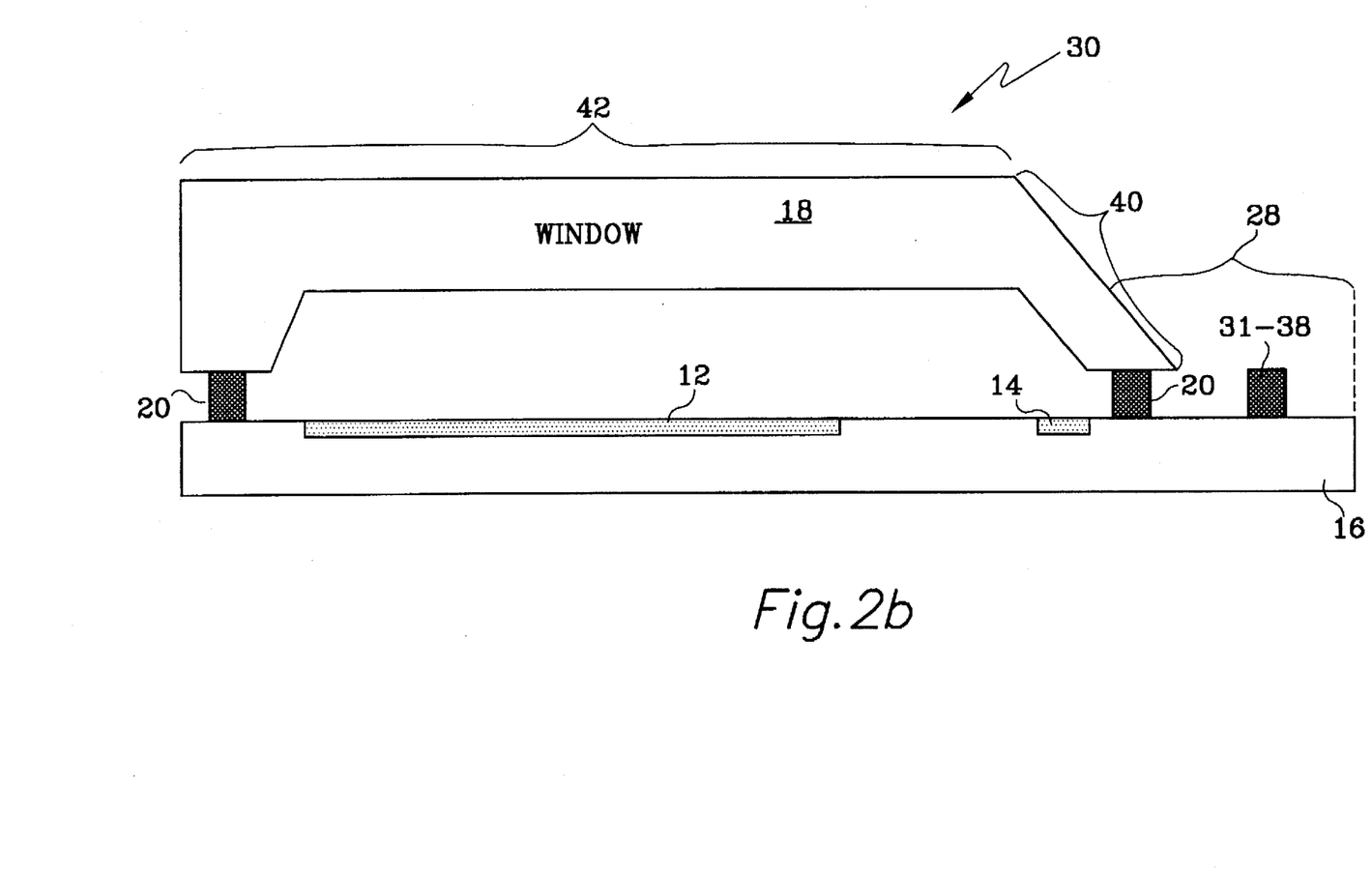

FIGS. 2a and 2b show an IVP comfort sensor 30 that is similar to sensor 10 of FIGS. 1a and 1b, except that secondary array 14 is positioned in such a way that sloping area 40 of top cap 18 is over secondary array 14 while main array 12 is under flat portion 42 of window 18. Here, the infrared rays are bent as they pass through sloped part 40 of top cap 18, thus resulting in an effective field of view of secondary array 14 being different than the field of view for main array 12.

Figure 3:
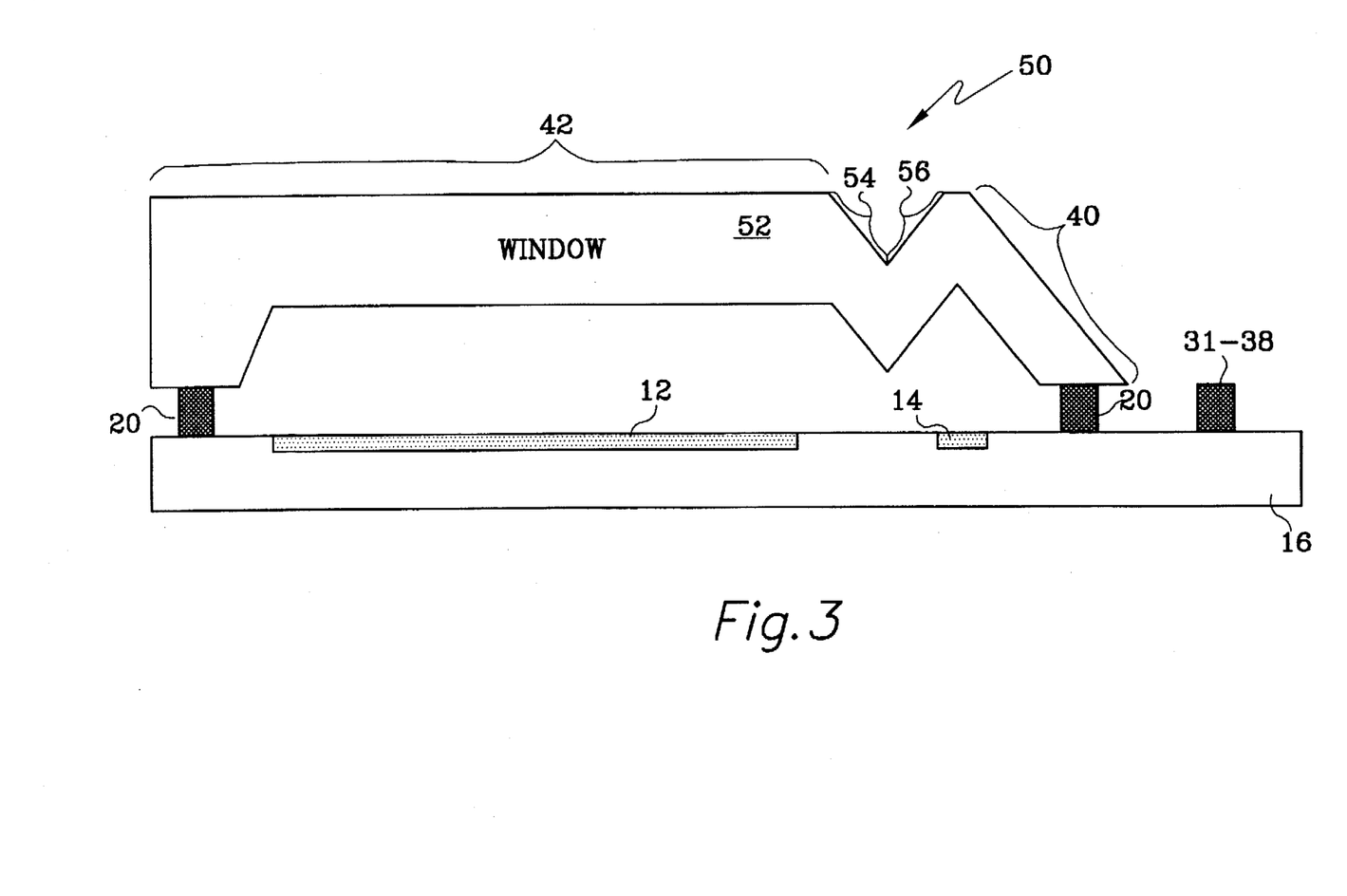
FIG. 3 has facets etched into the top surface of the window to provide another field of view for the secondary sensor array.

FIG. 3 shows a sensor 50 having facets 54 and 56 etched into the top surface of window 52 to provide another field of view for secondary IR array 14.

Figure 4:
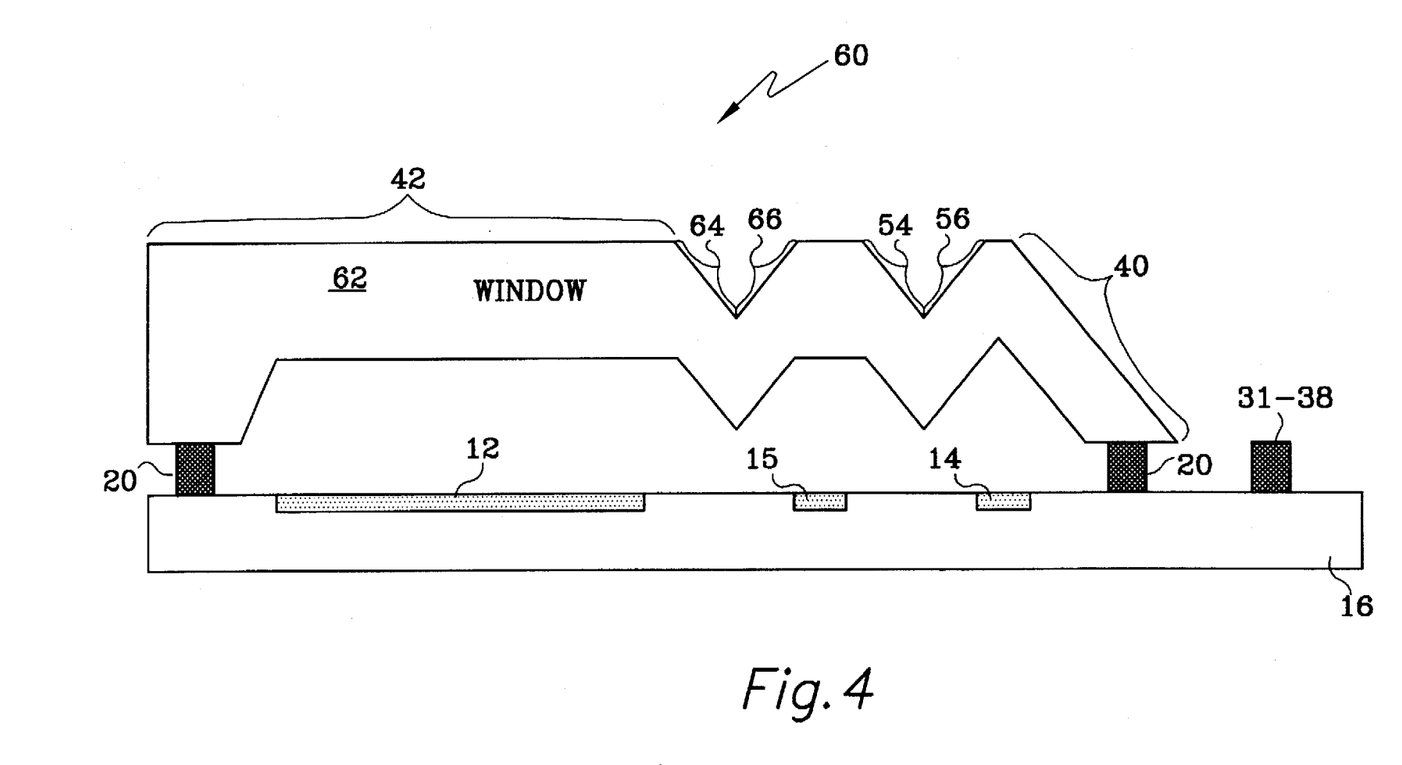
FIG. 4 has extra facets etched in the top surface of the window for different fields of view for second and third sensor arrays.

FIG. 4 shows a sensor 60 having additional facets 64 and 66 to provide still another field of view for a third IR array 15, in addition to that for main array 12 and secondary array 14. Further facets may be etched in window 62 to provide other fields of view for additional IR arrays in the same package of sensor 60, for such purposes as identifying the occupancy of various or distinct areas in a large room.

Figure 5:
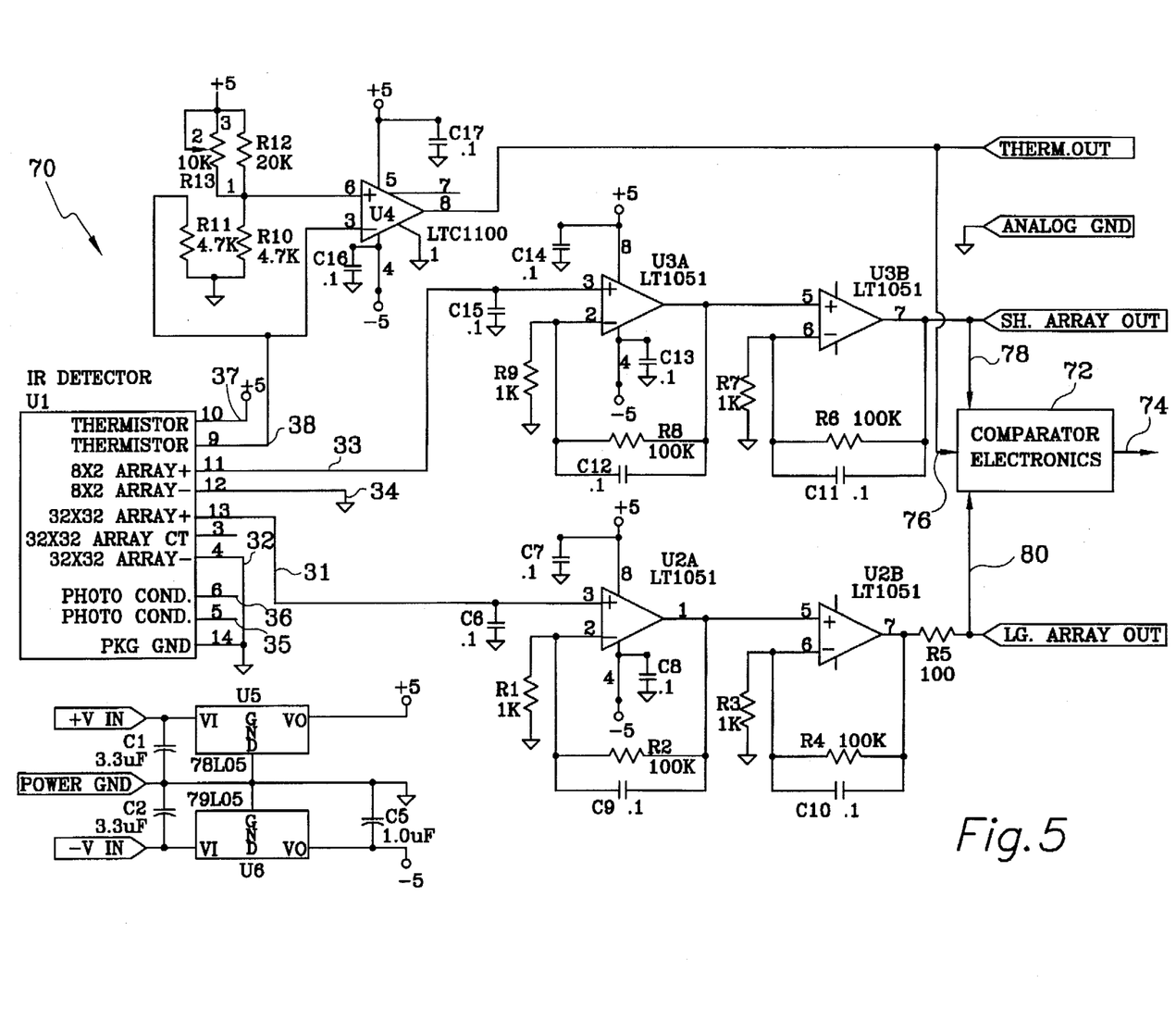
FIG. 5 is a schematic of the processing electronics for the occupancy sensor array.

FIG. 5 shows an example of electronics 70 that may be used for processing signals from occupancy sensors 10, 30 and 50 of FIGS. 1a–1b, 2a–2b, and 3, respectively. Sensor data connections 31–38 are noted at the inputs of electronics 70. The same sensor, or sensors having the same fields of view, may be used to determine background radiant temperature and to determine occupancy. Comparative processing electronics 72 is added to selectively subtract out the higher temperature radiators to determine background IR intensity, and consequently the level of occupancy of the monitored area, at output 74. Compensating electronics may adjust output 74 according to temperature input 76 from sensor 26 electronics. Inputs from primary infrared radiation sensor 12 and secondary infrared radiation sensor 14, signal processed by sensor electronics 70, are entered into comparative electronics 74 via lines 80 and 78, respectively.

We claim:

1. An occupancy sensor comprising:
a primary infrared radiation sensor formed on a substrate;
a first secondary infrared radiation sensor formed on the substrate;
a second secondary infrared radiation sensor formed on the substrate;
a vacuum seal situated on the substrate and around the said primary infrared radiation sensor, and said first and second secondary infrared radiation sensors; and
a window situated as a top cap on said vacuum seal to form an integrated vacuum package containing said primary infrared radiation sensor, and said first and second secondary infrared radiation sensors; and
wherein said window has at least one etched facet to provide different fields of view of a monitored space for said primary infrared radiation sensor, said first secondary infrared radiation sensor and said second secondary infrared radiation sensor, respectively.

2. The occupancy sensor of claim 1 further comprising a plurality of primary infrared radiation sensors.

3. The occupancy sensor of claim 2 wherein said window has a first plurality of etched facets to provide different fields of view of the monitored space for said plurality of primary infrared radiation sensors, respectively.

4. An occupancy sensor comprising:
a substrate;
a primary infrared radiation sensor formed on said substrate;
a secondary infrared radiation sensor formed on said substrate;
a seal situated on said substrate and around said primary and secondary infrared radiation sensors;
a window situated on said seal forming a vacuum sealed enclosure containing said primary and secondary infrared radiation sensors;
a visible light sensor; and
a temperature sensor; and
wherein:
said window provides a field of view for said primary and secondary infrared radiation sensors; and
said occupancy sensor is placed in an area for detecting and indicating whether or not there are occupants in the area.

5. The occupancy sensor of claim 4 further comprising signal processing means for processing signals from said primary and secondary infrared radiation sensors, said visible light sensor and said temperature sensor, and for providing a compensated signal indicating an occupancy status of the area.

6. The occupancy sensor of claim 5 wherein:

said window provides a first field of view for said primary infrared radiation sensor and a second field of view for said secondary infrared radiation sensor;

the first field of view is for passing infrared radiation from a first portion of an area occasionally having occupants, to said primary infrared radiation sensor;

the second field of view is for passing infrared radiation from a second portion of the area having no occupants, to said secondary infrared radiation sensor; and wherein:

said primary infrared radiation sensor provides an electrical signal indicating an occupancy status based on an amount of infrared radiation received through the first field of view;

said secondary infrared radiation sensor provides an electrical signal indicating an amount of background infrared radiation received through the second field of view; and said signal processing means receives and compares the electrical signal from said primary infrared radiation sensor with the electrical signal from said secondary infrared radiation sensor to determine the occupancy status of the first portion of the area.

7. The occupancy sensor of claim 4 wherein said substrate and window are formed from silicon.

8. The occupancy sensor of claim 4 wherein said substrate and window are formed from GaAs.

9. The occupancy sensor of claim 4 wherein:

said primary infrared radiation sensor comprises a plurality of thermocouples connected in series to form an uncooled infrared radiation microbolometer sensor; and said secondary infrared radiation sensor comprises a plurality of thermocouples connected in series to form an uncooled infrared radiation microbolometer sensor.

10. An occupancy sensor comprising:

a substrate;

a primary infrared radiation sensor formed on said substrate;

a secondary infrared radiation sensor formed on said substrate;

a seal situated on said substrate and around said primary and secondary infrared radiation sensors;

a window situated on said seal forming a vacuum sealed enclosure containing said primary and secondary infrared radiation sensors; and signal processing means for processing signals from said primary and secondary infrared radiation sensors, a visible light sensor and a temperature sensor, and for providing a compensated signal indicating an occupancy status of the area; and wherein:

said window provides a first field of view for said primary infrared radiation sensor and a second field of view for said secondary infrared radiation sensor;

the first field of view is for passing infrared radiation from a first portion of an area occasionally having occupants, to said primary infrared radiation sensor;

the second field of view is for passing infrared radiation from a second portion of the area having no occupants, to said secondary infrared radiation sensor;

said primary infrared radiation sensor provides an electrical signal indicating an occupancy status based on an amount of infrared radiation received through the first field of view;

said secondary infrared radiation sensor provides an electrical signal indicating an amount of background infrared radiation received through the second field of view; and said signal processing means receives and compares the electrical signal from said primary infrared radiation sensor with the electrical signal from said secondary infrared radiation sensor to determine the occupancy status of the first portion of the area.

11. An occupancy sensor comprising:

a primary infrared radiation sensor formed on a substrate;

a secondary infrared radiation sensor formed on the substrate;

a vacuum seal situated on the substrate and around the said primary infrared radiation sensor, and said secondary infrared radiation sensor; and a window situated as a top cap on said vacuum seal to form an integrated vacuum package containing said primary infrared radiation sensor, and said secondary infrared radiation sensors; and wherein said window has at least one etched facet to provide different fields of view of a monitored space for said primary infrared radiation sensor, and said secondary infrared radiation sensor, respectively.

12. An occupancy sensor comprising:

at least one primary infrared radiation sensor formed on a substrate;

a plurality of secondary infrared radiation sensors formed on the substrate;

a vacuum seal situated on the substrate and around the said at least one primary infrared radiation sensor, and said plurality secondary infrared radiation sensors; and a window situated as a top cap on said vacuum seal to form an integrated vacuum package containing said at least one primary infrared radiation sensor, and said plurality secondary infrared radiation sensors; and wherein said window has at least one etched facet to provide different fields of view of a monitored space for said at least one primary infrared radiation sensor, and said plurality of secondary infrared radiation sensors, respectively.

13. The occupancy sensor of claim 12 wherein said window has a plurality of etched facets to provide various fields of view of the monitored space for said plurality of secondary infrared radiation sensors.

* * * * *